Figure 1:
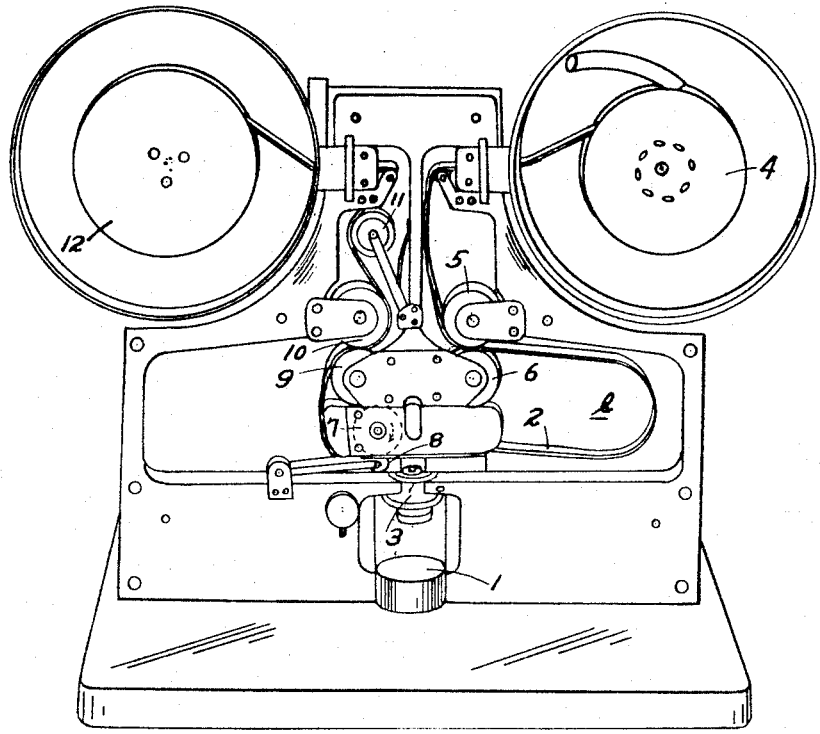

Feb. 25, 1964   G. HEFLEY ETAL   3,122,076
INTERMITTENT ACTION CAMERA

Filed Sept. 19, 1960                    2 Sheets-Sheet 1

INVENTORS
GIFFORD HEFLEY
ROBERT F. LINFIELD
ROBERT H. DOHERTY
BY EARL L. BERGER
ATTY.
AGENT

Feb. 25, 1964 G. HEFLEY ETAL 3,122,076
INTERMITTENT ACTION CAMERA
Filed Sept. 19, 1960 2 Sheets-Sheet 2
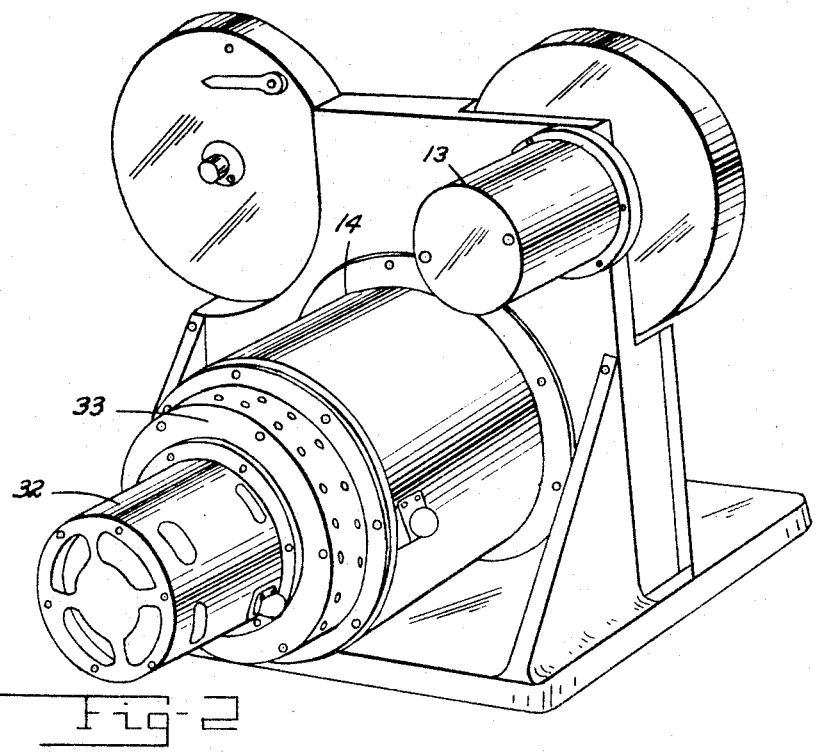
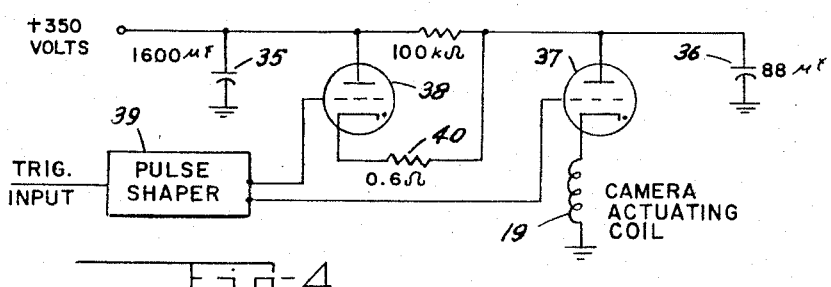
INVENTORS
GIFFORD HEFLEY
ROBERT F. LINFIELD
BY ROBERT H. DOHERTY
EARL L. BERGER
ATTY
AGENT

United States Patent Office 3,122,076
Patented Feb. 25, 1964

3,122,076
INTERMITTENT ACTION CAMERA
Gifford Hefley, Robert F. Linfield, Robert H. Doherty, and Earl L. Berger, all of Boulder, Colo., assignors to the United States of America as represented by the Secretary of the Air Force
Filed Sept. 19, 1960, Ser. No. 57,084
6 Claims. (Cl. 95—31)
(Granted under Title 35, U.S. Code (1952), sec. 266)

The invention described herein may be manufactured and used by or for the United States Government for governmental purposes without payment to us of any royalty thereon.

The purpose of this invention is to provide an intermittent action camera capable of recording, as from the screen of an oscilloscope, events occurring randomly over a long period of time. The events may be of very short duration and at times may occur with great rapidity. For example, the camera may be designed to complete an operating cycle in 7 milliseconds, of which about 2 milliseconds are available for exposing the film and about 5 milliseconds are consumed in advancing the film one frame. Therefore, in this particular design, events of less than 2 millisecond duration occurring as rapidly as one every 7 milliseconds may be recorded. The camera is particularly suited to the recording of atmospheric phenomena such as the electromagnetic radiation resulting from lightning strokes.

Because of excessive film consumption, strip cameras are impractical for recording events of the above type over a long period of time, and framing cameras now available do not have sufficiently high framing rates. The primary object of the invention, therefore, is to provide a framing camera having a high enough framing rate to permit the recording of events of the above described type.

The high framing rate of the camera results from the use of a unique clutch system between the film drive and a continuously rotating flywheel which provides the energy for the high film accelerations required. The clutch mechanism is similar to a large electrodynamic speaker. When a pulse of electrical energy is applied to a part corresponding to the voice coil of the speaker, a cone is driven into engagement with the flywheel, thus rotating a small drum in contact with the film. The amount of film advance is determined essentially by the duration of the energy pulse applied to the moving coil. The peak power of this pulse may be, for example 35 kw. This power is supplied from two condensers, a smaller one which discharges directly through the coil and a larger one for charging the smaller condenser. With this arrangement, power surges of the above magnitude may be repeated at intervals of only a few milliseconds, the number of repetitions depending upon the size of the large condenser, while the power supply required to operate the system need only provide an average current sufficient to maintain the charge on the large condenser at the maximum duty cycle.

Figure 3:
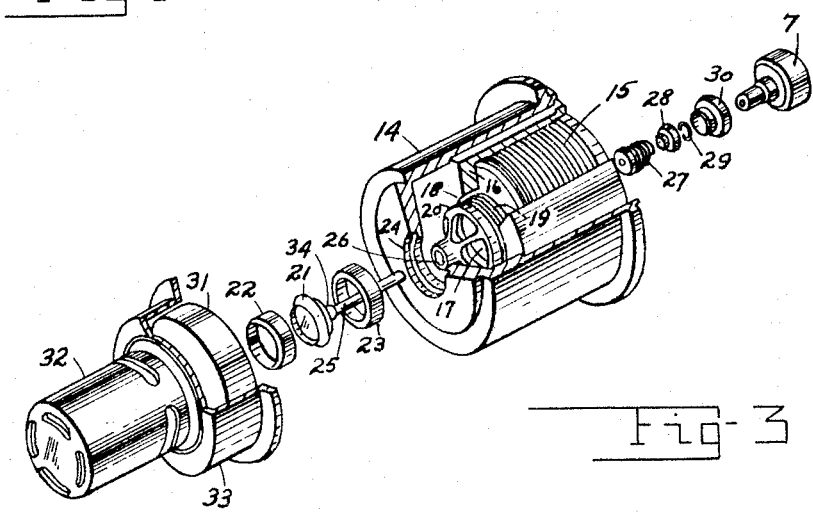

A more detailed description of the invention will be given with reference to the specific embodiment thereof shown in the accompanying drawing in which FIG. 1 is a view of the camera with its cover removed to show part of the film drive mechanism, FIG. 2 is an external view of the camera, FIG. 3 is an exploded view of the clutching mechanism, and FIG. 4 is a schematic diagram of the camera electronic circuit.

Referring to FIG. 1, the screen 1 of an oscilloscope is imaged on film 2 by lens system 3 at a point directly above the lens system. The film path extends from supply reel 4, between metering rollers 5 and 6, around the film loop *l*, beneath the camera pressure plate (not shown), between film drive roller 7 and tension roller 8, between metering drive rollers 9 and 10, over shock absorber roller 11 and thence to take-up reel 12. A constant torque is applied to take-up reel 12 by motor 13 (FIG. 3) operated under stall conditions.

The film is advanced by drive roller 7 which may be neoprene coated to provide good frictional engagement across the entire width of the film. A sprocket drive wheel is not used because of the high point contact pressures that would be developed against the film in attaining the required high film acceleration. The film is held in contact with the drive roller by means of spring loaded tension roller 8. Provision is made to release the spring tension of roller 8 to facilitate film loading; however, this feature as well as the tension spring arrangement follow standard practice and therefore are not illustrated for the sake of simplicity.

As the film is advanced by drive roller 7 it is taken up by reel 12 which, as stated above, has a constant take-up torque applied to it. As the film advances toward the take-up reel it drives rollers 9—10 which are geared to metering rollers 5—6, causing an equal amount of film to be payed out from supply reel 4 and maintaining on the average a constant amount of film in loop *l*. The loop is necessary in order to reduce to a minimum the load presented by the film to drive roller 7 and to prevent high stress in the film.

The film drive mechanism is shown in exploded form in FIG. 3, and the external appearance of the mechanism when assembled is shown in FIG. 2. Referring to FIG. 3, magnet case 14 contains an electromagnet comprising a coil 15 wound on a core having poles 16 and 17 with an annular air gap 18 therebetween. A coil of copper wire wound on a light weight but strong shell 20, which may be made of aluminum, for example, is freely suspended for axial movement in the air gap by a suitable spider (not shown). The construction of the electromagnet, the moving coil and the method of supporting the coil in the air gap all follow very closely the design of a large electromagnetic speaker.

A clutch and braking device is provided consisting of a driven member 21, a driving member 22 and a braking member 23. Braking element 23 is made to seat snugly in counterbore 24 in magnet case 14. Driven element 21 is attached to the end of shaft 25 which passes freely through the hub 26 of coil shell 20, through the inner core of the magnet and through the end of the magnet case 14. The shaft also passes through coil spring 27 which acts in compression between the magnet case 14 and anti-friction bearing 28, which reacts in turn against shaft snap ring 29, to normally force driven element 21 against braking element 23. Roller 7 is splined to the end of shaft 25, to permit axial movement of the shaft, and may run in a suitable bearing 30.

The driving element 22 of the clutch fits snugly into a recess in flywheel 31 driven at constant speed, for example 3600 r.p.m., by motor 32. When the flywheel case 33 is assembled against magnet case 14 and when driven clutch member 21 is in contact with braking element 23, there is a slight separation of the driving and driven members of the clutch. The clutch and brake elements are preferably tapered to form sections of a cone, with the angle of the taper close to the critical angle of the cone of friction in order to obtain maximum friction without wedging of the components. Nylon is a suitable material for driving element 22 and braking element 23, which may be identical in construction.

The clutch is actuated by applying a pulse of current to coil 19. This produces an axial force against the conductors of the coil which is transmitted through shell 20 and hub 26 to driven member 21. An anti-friction thrust bearing is preferably located at 34 between the hub and the driven member. In this manner a friction coupling is established between flywheel 31 and film drive roller 7 through shaft 25.

The kinetic energy stored in the flywheel provides the high instantaneous torque necessary to accelerate the film transport mechanism when the clutch is engaged. The size of the flywheel is governed by the maximum duty cycle of the film advance since the flywheel must store sufficient energy that the motor speed will not be significantly reduced during the maximum operating rate.

The force exterted by the coil 19 against the driven member of the clutch is proportional to the flux density in the air gap, the wire length and the current. The time during which the force is applied depends upon the length of time the current flows. Therefore, the film advance is controlled by varying the period of time during which the current flows through the coil.

The circuit for applying a pulse of current to coil 19 is shown in FIG. 4. This circuit is designed to deliver high current for short durations and at rapid intervals. A large condenser reservoir 35 supplies this high current intermittently and thus reduces the current which must be drawn from the power supply to an average value sufficient to sustain the average pulse rate. For example, a 1600 microfarad condenser will provide approximately ten advances at maximum speed in a camera utilizing 16 mm. film with a 24 mm. frame advance and a power supply capable of delivering 275 milliamperes will support an average rate of 60 frames per second. The average rate may be increased by using a larger power supply and the number of adjacent advances may be increased by using a larger condenser. The camera drive is actuated by discharging a smaller condenser 36, which may have a capacity of 88 microfarads for example, through coil 19 by means of thyratron 37. The condenser 36 is then recharged from condenser 35 by the use of a second thyratron 38. These operations are initiated by a main trigger pulse of a few microseconds duration which is applied to the thyratron trigger circuit 39. Circuit 39 generates a 40 microsecond pulse which is applied to the grid of thyratron 37 and causes condenser 36 to discharge through coil 19. The main trigger pulse is also delayed 2 milliseconds in circuit 39 and then used to generate a second 40 microsecond pulse which is applied to the grid of thyratron 38 causing this tube to fire and condenser 36 to be rapidly recharged from condenser 35 through low current limiting resistance 40.

The main trigger is usually derived from the event to be recorded. For example, in recording electromagnetic radiation due to lightning strokes, the main trigger may be derived from the output of the receiver receiving the radiation. The receiver output may be slightly delayed if neecssary to insure that the total signal to be recorded occurs after the trigger. The main trigger is used to unblank the oscilloscope, to initiate the oscilloscope sweep and to initiate action of thyratron trigger circuit 39. The oscilloscope sweep may have a duration of from 500 to 1000 microseconds, for example. A trace appears on the screen 1 of the oscilloscope representing the magnitude of the radiation as a function of time. The film is stationary during the sweep because of an approximately 1.5 milliseconds system delay between the main trigger and the start of actual film advance, and the exposure of the film is made during this interval. Since the oscilloscope is unblanked only during the sweep and its screen is dark at all other times, a camera shutter is not required.

A little more than 5 milliseconds is required to advance the film one frame. Therefore the length of the operating cycle of the camera is the sum of the 1.5 milliseconds system delay and the 5+ milliseconds film transport time, or about 7 milliseconds. If desired, a suitable trigger pulse blocking circuit may be employed to prevent premature triggering of the camera during its operating cycle by an event occurring less than 7 milliseconds after the preceding event. It will be apparent that the film is transported only one frame for each event recorded. Therefore the instrument can be used to record randomly occurring events over a long period of time with a minimum consumption of film.

The above figures are for a specific embodiment of the camera using 16 mm. film, a drive roller 1 inch in diameter and a film advance of 24 mm. per frame. The film transport time may be reduced by increasing motor speed or drive roller diameter, or a combination of these two procedures. For example, increasing the drive roller diameter to 3 inches would reduce the transport time to less than 2 milliseconds. In any change of this type an appropriate decrease in the size of condenser 36 would be necessary in order to reduce the length of time current flows in coil 19 and the length of time the clutch is engaged in order to keep the film advance per frame the same as before.

We claim:

1. A film transport mechanism for an intermittent action strip film camera comprising: a flywheel; means for driving said flywheel at constant speed; a friction clutching and braking device having a driving element attached to said flywheel, a fixed braking element, and a driven element situated between said driving and braking elements; a film drive roller having a smooth surface for frictional engagement across the entire width of the film; an output shaft having one end attached to said driven element and the other end in rotatably locked but axially free engagement with said roller; said flywheel, said driving, braking and driven elements, said shaft, and said roller being centered on a common axis; spring means acting on said shaft for normally biasing said driven element out of contact with said driving element and into contact with said braking element; and apparatus for momentarily forcing said driven element into contact with said driving element and out of contact with said braking element against the action of said biasing means, said apparatus comprising a magnet having an annular air gap concentric with said shaft, a coil of wire supported for axial movement in said air gap by a coil support having a hub loosely surrounding said shaft adjacent to said driven element, and means for sending a pulse of electric current through said coil.

2. Apparatus as claimed in claim 1 in which the last means comprises a relatively large condenser permanently connected to a source of charging current, a relatively small condenser, means responsive to a trigger pulse for discharging the smaller condenser through said coil, and means operative a predetermined interval after said trigger pulse for charging the smaller condenser from the larger condenser.

3. An intermittent action strip film camera of high framing rate comprising: an optical system; means positioning a section of said film at a film exposure position in the focal plane of said optical system; a film supply reel; a film metering device for drawing film from said supply reel into a film loop situated between said metering device and said exposure position; a film drive roller, having a smooth surface for frictional engagement across the entire surface of said film, situated adjacent said exposure position and on the opposite side thereof from said loop; means for forcing said film into frictional engagement with said film drive roller; a film take-up reel having constant take-up torque applied thereto; means engaging said film between said drive roller and said take-up reel and driven by said film for actuating said metering device in response to any take-up of film by said take-up reel to withdraw an equal amount of film from said supply reel; a flywheel; means driving said flywheel at constant speed; a friction clutching and braking device having a driving element attached to said flywheel, a fixed braking element, and a driven element situated between said driving and braking elements; a shaft having one end attached to said driven element and the other end in rotatably locked but axially free engagement with said film drive roller; said flywheel, said driving, braking and driven elements, said shaft and said roller being centered on a common axis; spring means acting on said shaft for normally biasing said driven element out of contact with said driving element and into contact with said braking element; and apparatus for momentarily forcing said driven element into contact with said driving element and out of contact with said braking element against the action of said biasing means, said apparatus comprising a magnet having an annular air gap concentric with said shaft, a coil of wire supported for axial movement in said air gap by a coil support having a hub loosely surrounding said shaft adjacent to said driven element, and means for sending a pulse of electric current through said coil.

4. Apparatus as claimed in claim 3 in which the last means comprises a relatively large condenser permanently connected to a source of charging current, a relatively small condenser, a first thyratron connected between the smaller condenser and said coil, a second thyratron connected between the larger condenser and the smaller condenser, means responsive to a trigger pulse for firing said first thyratron to discharge the smaller condenser through said coil, and means operative a predetermined interval after said trigger pulse to fire said second thyratron for charging the smaller condenser from the larger condenser.

5. Apparatus as claimed in claim 4 in which said second thyratron is shunted by a relatively large resistance to maintain the charge on the smaller condenser during long intervals between trigger pulses.

6. A film transport mechanism for an intermittent action strip film camera comprising: a flywheel; means for driving said flywheel at constant speed; a friction clutching and braking device having a driving element attached to said flywheel, a fixed braking element, and a driven element situated between said driving and braking elements; a film drive roller having a smooth surface for frictional engagement across the entire width of the film; an output shaft having one end attached to said driven element and the other end in rotatably locked but axially free engagement with said roller; said flywheel, said driving, braking and driven elements, said shaft, and said roller being centered on a common axis; spring means acting on said shaft for normally biasing said driven element out of contact with said driving element and into contact with said braking element; and apparatus for momentarily forcing said driven element into contact with said driving element and out of contact with said braking element against the action of said biasing means.

References Cited in the file of this patent

UNITED STATES PATENTS

| | | |
|---|---|---|
| 1,866,128 | Pfeiffer | July 5, 1932 |
| 2,180,412 | Hart | Nov. 21, 1939 |
| 2,791,933 | Crockett | May 14, 1957 |
| 2,878,733 | Zoglemann | Mar. 24, 1959 |
| 2,906,162 | Taylor | Sept. 29, 1959 |
| 2,909,096 | Barnett | Oct. 20, 1959 |
| 3,011,418 | Takahama | Dec. 5, 1961 |